US010872292B1

United States Patent
Yang et al.

(10) Patent No.: US 10,872,292 B1
(45) Date of Patent: Dec. 22, 2020

(54) COMPACT NEURAL NETWORKS USING CONDENSED FILTERS

(71) Applicants: Yingzhen Yang, Los Angeles, CA (US); Jianchao Yang, Los Angeles, CA (US); Ning Xu, Irvine, CA (US)

(72) Inventors: Yingzhen Yang, Los Angeles, CA (US); Jianchao Yang, Los Angeles, CA (US); Ning Xu, Irvine, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/155,656

(22) Filed: Oct. 9, 2018

Related U.S. Application Data

(60) Provisional application No. 62/569,907, filed on Oct. 9, 2017.

(51) Int. Cl.
*G06K 9/00* (2006.01)
*G06N 3/04* (2006.01)
*G06T 7/10* (2017.01)
*G06T 5/20* (2006.01)

(52) U.S. Cl.
CPC ............... *G06N 3/04* (2013.01); *G06T 5/20* (2013.01); *G06T 7/10* (2017.01)

(58) Field of Classification Search
CPC combination set(s) only.
See application file for complete search history.

(56) References Cited

U.S. PATENT DOCUMENTS

| | | | |
|---|---|---|---|
| 2002/0021828 A1* | 2/2002 | Papier | G06F 19/324 382/128 |
| 2018/0129935 A1* | 5/2018 | Kim | G06N 3/082 |

OTHER PUBLICATIONS

Yiping, SAR Image segmentation based on convolutional-wavelet neural network and markov random field, Nov. 2016, Science Direct (Year: 2016).*
Selesnick, The Dual-Tree Complex Wavelet Transform, Nov. 2005, IEEE (Year: 2005).*

* cited by examiner

*Primary Examiner* — Alex Kok S Liew
(74) *Attorney, Agent, or Firm* — Schwegman Lundberg & Woessner, P.A.

(57) ABSTRACT

A compact neural network system can generate multiple individual filters from a compound filter. Each convolutional layer of a convolutional neural network can include a compound filters used to generate individual filters for that layer. The individual filters overlap in the compound filter and can be extracted using a sampling operation. The extracted individual filters can share weights with nearby filters thereby reducing the overall size of the convolutional neural network.

18 Claims, 13 Drawing Sheets

US 10,872,292 B1

COMPACT NEURAL NETWORKS USING CONDENSED FILTERS

PRIORITY

This application claims the benefit of priority of U.S. Provisional Application Ser. No. 62/569,907, filed on Oct. 9, 2017, which is hereby incorporated by reference herein in its entirety

TECHNICAL FIELD

The present disclosure generally relates to machines configured to the technical field of special-purpose machines that manage electronic data processing and improvements to such variants, and to the technologies by which such special-purpose machines become improved compared to other special-purpose machines for performing efficient data processing using neural networks.

BACKGROUND

Machine learning schemes enable computers to perform dramatic image manipulation processes. However, some machine learning schemes, e.g., neural networks, are complex and take up large amounts of computational resources (e.g., processor power, memory space). As such, some resource limited computers, such as mobile devices, cannot efficiently store and execute complex machine learning schemes.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned, it is difficult for some resource limited computers to implement complex machine learning schemes, such as convolutional neural networks. To this end, a compact neural network system can implement compound filters that generate a plurality of additional filters for use in convolutional layers of a convolutional neural network. In some example embodiments, each convolutional layer has a compound filter that is used to generate filters for that layer. In some example embodiments, the individual filters are extracted from the compound filter using a sampling process. The weights or parameters of the individual filters are shared among the filters. In some embodiments, the weights are shared in both the spatial dimension and channel dimensions, as discussed in further detail below. In this way, the compact neural network system can retain a small footprint and be efficiently executed on resource limited devices to produce high-quality results.

Figure 1:
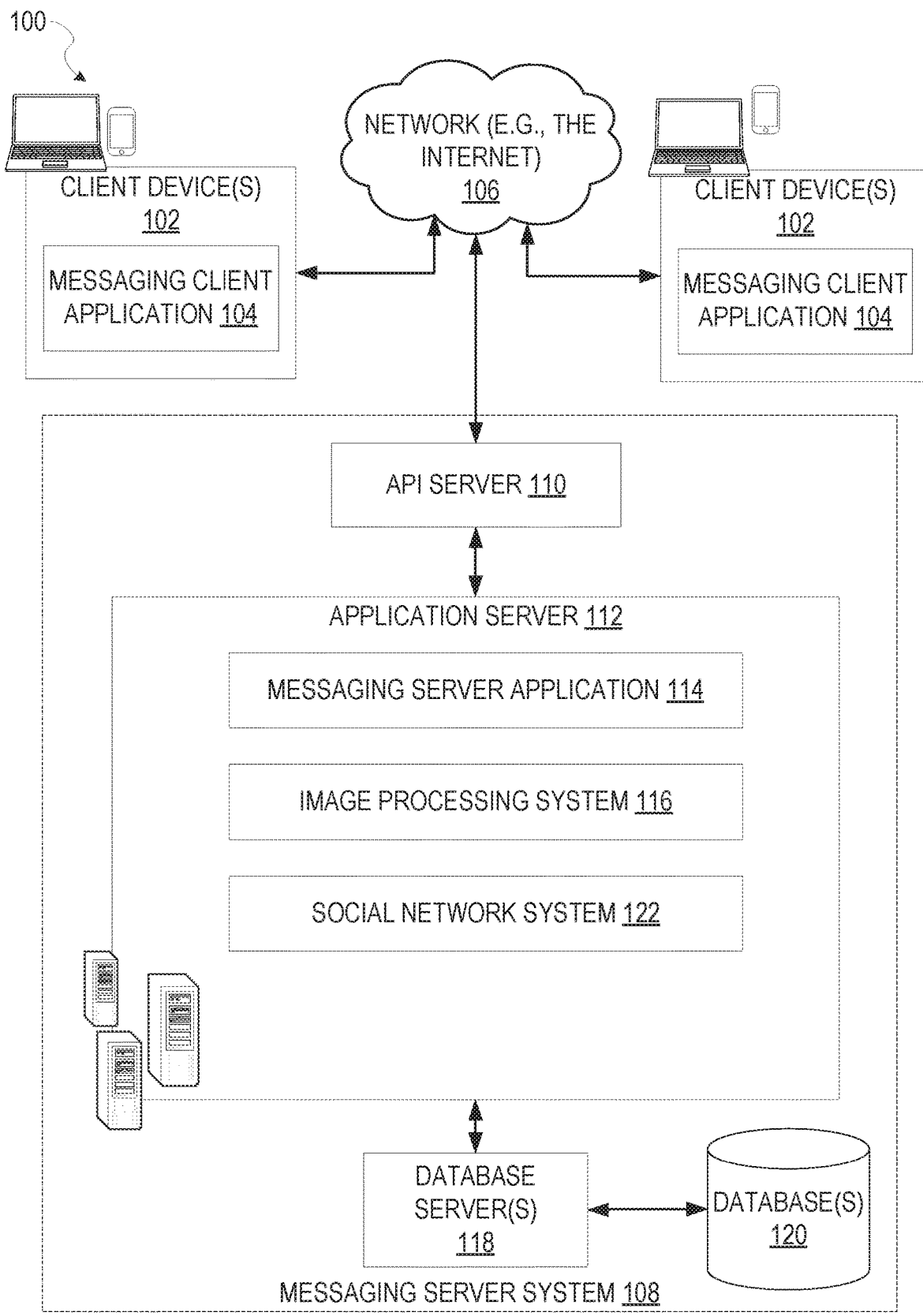
FIG. 1 is a block diagram showing an example messaging system for exchanging data (e.g., messages and associated content) over a network.

FIG. 1 shows a block diagram of an example messaging system 100 for exchanging data over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
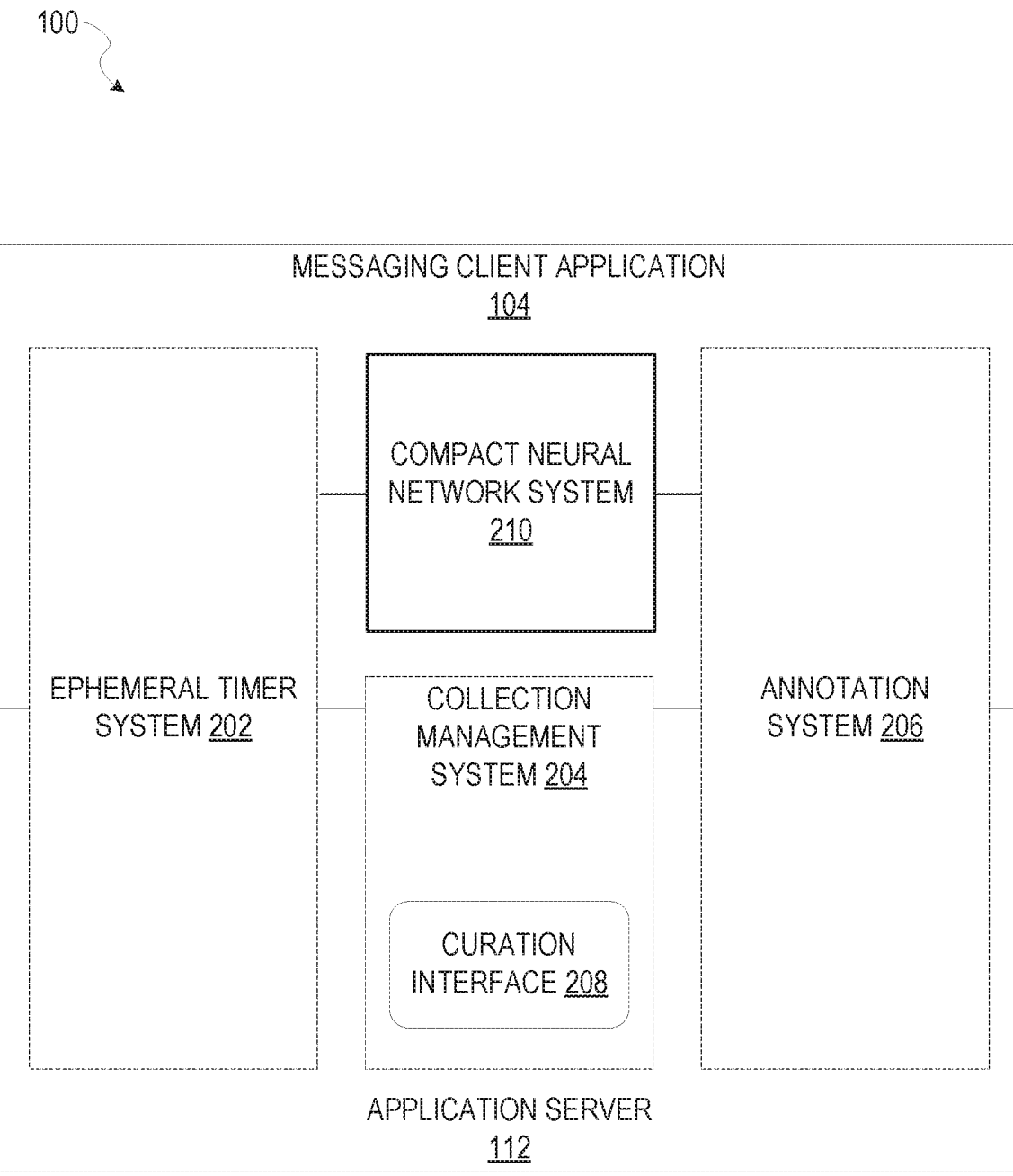
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a compact neural network system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., collection of social media posts), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The compact neural network system 210 uses a condensed or compound filter to generate multiple individual filters that can be used in a convolution layer of a convolutional neural network. Further details of the compact neural network system 210 are discussed below with reference to FIGS. 7-12.

Figure 3:
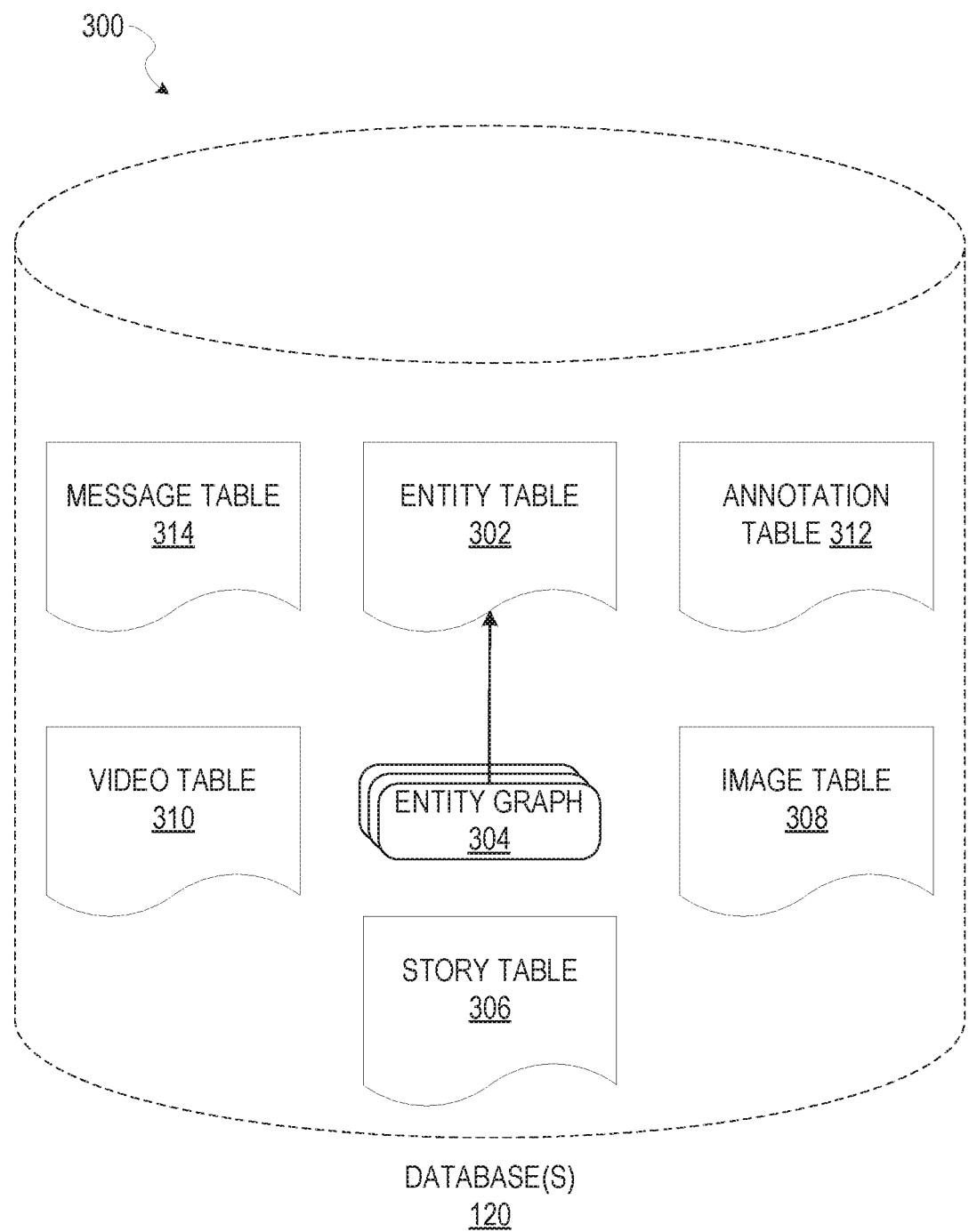
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
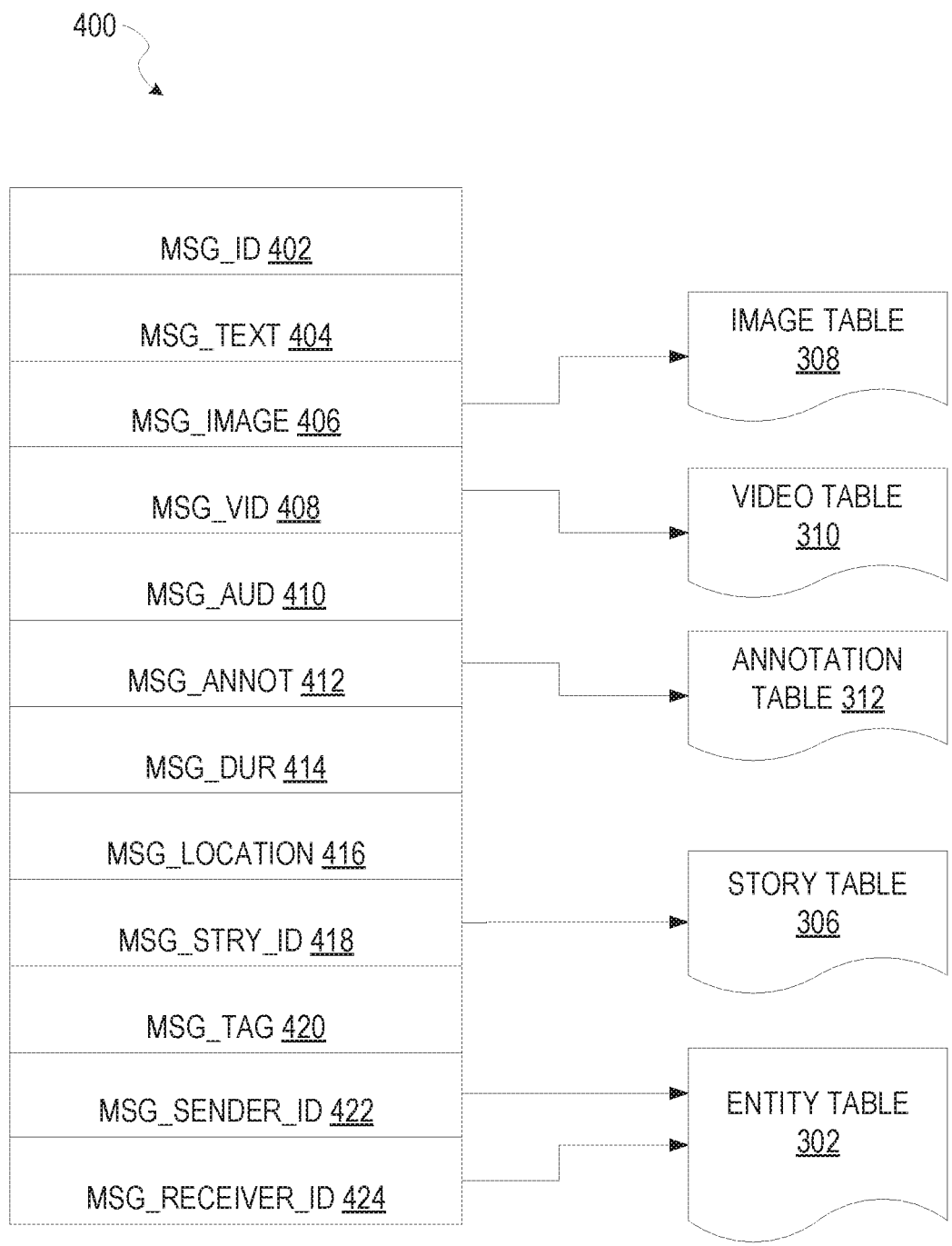
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data captured by a camera component of a client device 102 or retrieved from memory of a client device 102, and that is included in the message 400.
- A message video payload 408: video data captured by a camera component or retrieved from a memory component of the client device 102, and that is included in the message 400.
- A message audio payload 410: audio data captured by a microphone or retrieved from the memory component of the client device 102, and that is included in the message 400.
- Message annotations 412: annotation data (e.g., filters, stickers, or other enhancements) that represents annotations to be applied to the message image payload 406, message video payload 408, or message audio payload 410 of the message 400.
- A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).
- A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.
- A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
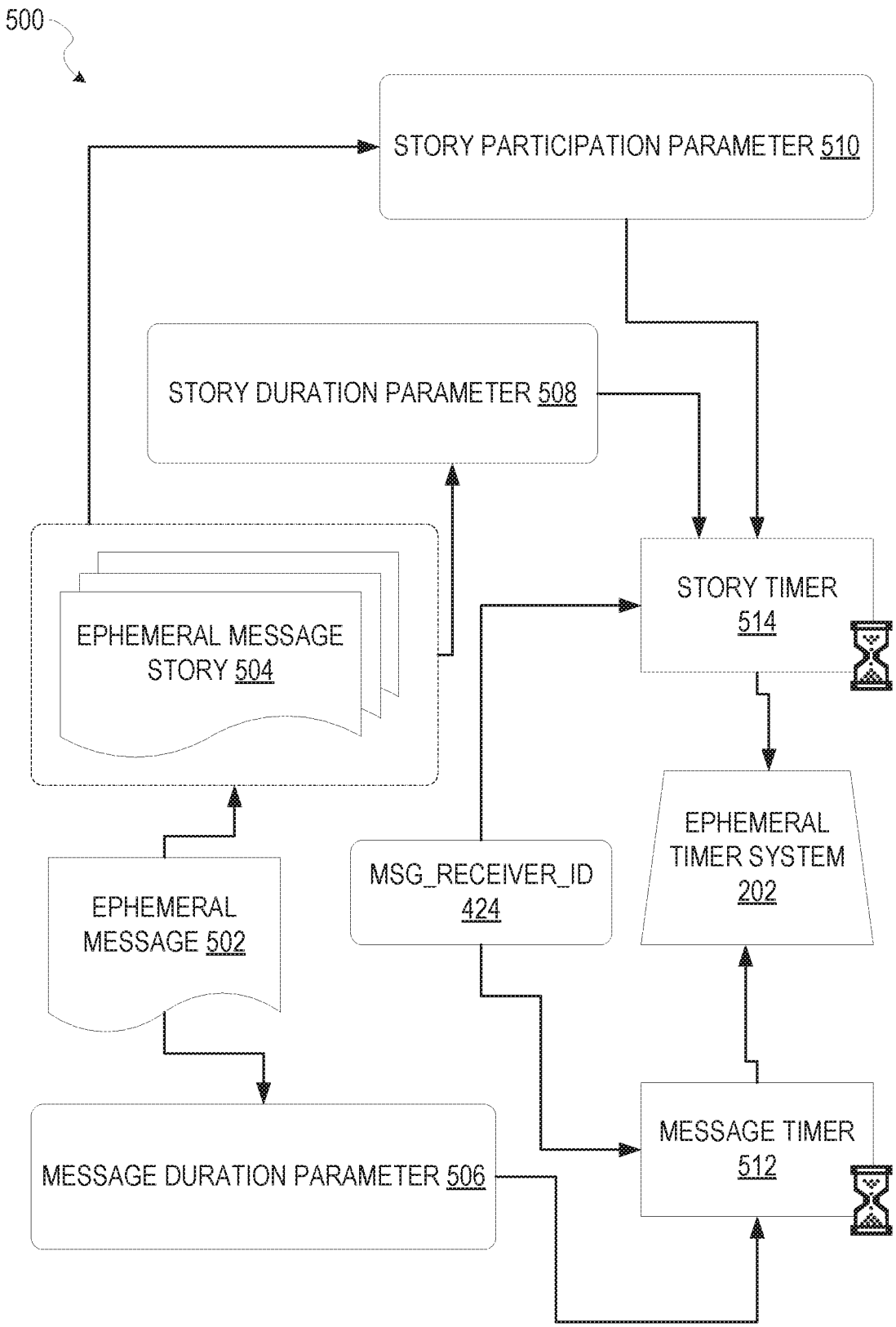
FIG. 5 is a schematic diagram illustrating an example access-limiting process, in terms of which access to content (e.g., an ephemeral message, and associated multimedia payload of data) or a content collection may be time-limited, according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a social network site application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
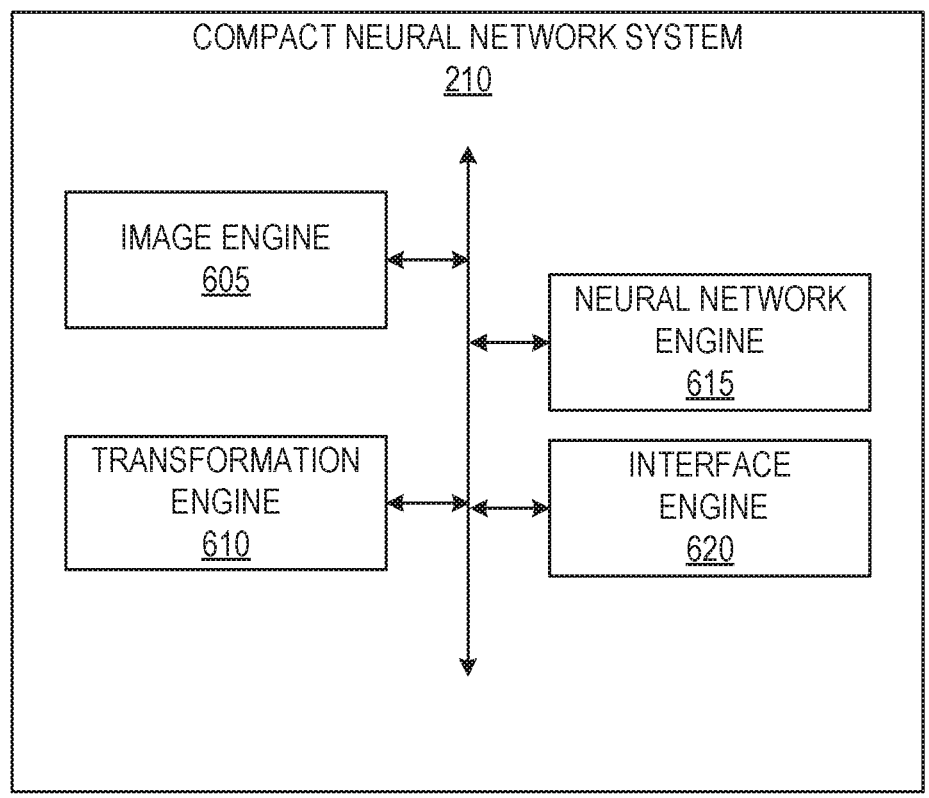
FIG. 6 shows example internal functional components of a compact neural network system, according to some example embodiments.

FIG. 6 shows example internal functional components of a compact neural network system 210, according to some example embodiments. As illustrated, the compact neural network system 210 comprises an image engine 605, a transformation engine 610, a neural network engine 615, and an interface engine 620. To avoid obscuring the inventive subject matter with unnecessary detail, various functional components (e.g., modules and engines) that are not germane to conveying an understanding of the inventive subject matter have been omitted from FIG. 6. However, a skilled artisan will readily recognize that various additional functional components may be supported by the compact neural network system 210 to facilitate additional functionality that is not specifically described herein.

As is understood by skilled artisans in the relevant computer arts, each functional component (e.g., engine) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the compact neural network system 210 may be combined into a single module, or subdivided among multiple modules. For example, although the example of the compact neural network engine 210 in FIG. 6 displays the transformation engine 610 and neural network engine 610 as separate engines, in some example embodiments, the transformation engine 610 is implemented as a sub-network integrated into the convolutional layers of a convolutional neural network managed by the neural network engine 615, as discussed in further detail below. Further, it shall be appreciated that while the functional components (e.g., engines) of FIG. 2 are discussed in the singular sense, in other embodiments, multiple instances of one or more of the modules may be employed.

The image engine 605 is configured to identify or generate an image. For example, the image engine 605 may generate an image using an image sensor of the client device 102. The transformation engine 610 is configured to identify a compound filter and generate multiple filters that can be used in a convolution layer of a convolutional neural network, according to some example embodiments. The neural network engine 615 is configured to implement a neural network that uses the filters generated by the transformation engine 610. In some example embodiments, the output of the neural network engine 615 is a modified version of the image generated captured by the image engine 605. For instance, the neural network engine 615 can comprise a convolutional neural network configured to perform image style transfer (e.g., Cycle Consistent Generative Adversarial Networks, "CycleGAN") using condensed filters. When applied to an input image, the compound filter enabled image style transfer network generates a modified version of the input image in a different style (e.g., applies a Monet-style to a self-portrait or "selfie" of the user of client device 102). It is appreciated that other neural network models, e.g., image segmentation, can likewise be implemented with compound filters. The interface engine 620 is configured to publish the modified image as an ephemeral message 504, according to some example embodiments.

Figure 7:
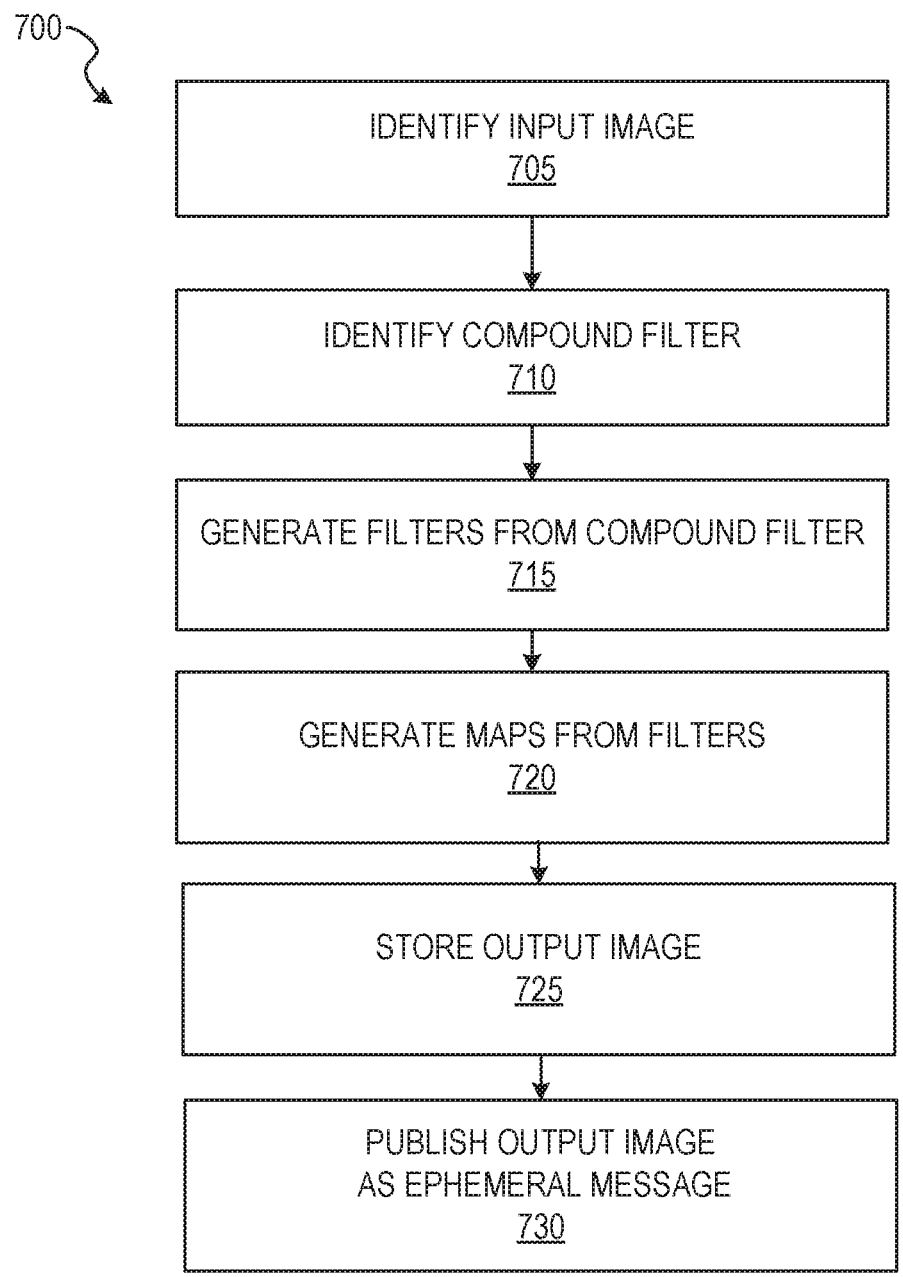
FIG. 7 shows a flow diagram of an example method for implementing a compact neural network using condensed compound filters, according to some example embodiments.

FIG. 7 shows a flow diagram of an example method 700 for generating images using compact neural networks having condensed filters, according to some example embodiments. At operation 705, the image engine 605 identifies an input image. For example, at operation 705, the image engine 605 uses an image capture sensor of the client device 102 to generate one or more images (e.g. an image, an image sequence, a video). In some example embodiments, the image engine 605 samples one or more of the captured images for use as an input image at operation 705. That is, for example, the client device 102 may be displaying a live video feed captured using its image sensor, and one or more images may be stored from the live feed for use as the input image at operation 705.

At operation 710, the transformation engine 610 identifies a compound filter for use in generating individual filters. At operation 715, the transformation engine 610 generates individual filters from the compound filter. The individual filters can each be convolutional kernels that can be applied to input data (e.g., an input image) to generate feature maps, which can then further processed by other layers of convolutional neural network. In some example embodiments, each convolution layer in the system 210 includes a compound filter to generate filters for that layer. Further, according to some example embodiments, the filters are generated from the compound filter using a transformation sub-network within each convolutional layer. The transformation sub-network is trained to receive a set of one or more condensed or compound filters and expand upon the set by generating a new set of filters for use as feature filters (e.g., convolution kernels). In some example embodiments, a transformation sub-network is integrated into each convolution layer. In each layer, the transformation sub-network transforms a compound filter (and weights or parameters) to many more filters. According to some example embodiments, the transformation sub-networks and the compound filters are trained using the end-to-end training, across all layers and the individual filters share weights to conserve space.

At operation 720, the neural network engine 615 uses the filters generated at operation 715 to generate feature maps. For example, each individual filter generated from a compound filter can be applied (e.g., convolved) as a kernel to image data to generate a feature map. At operation 725, the neural network engine stores an output image that is output by the neural network. At operation 730, the interface engine 620 publishes the output image as an ephemeral message (e.g., ephemeral message 504) on a social network site.

Figure 8:
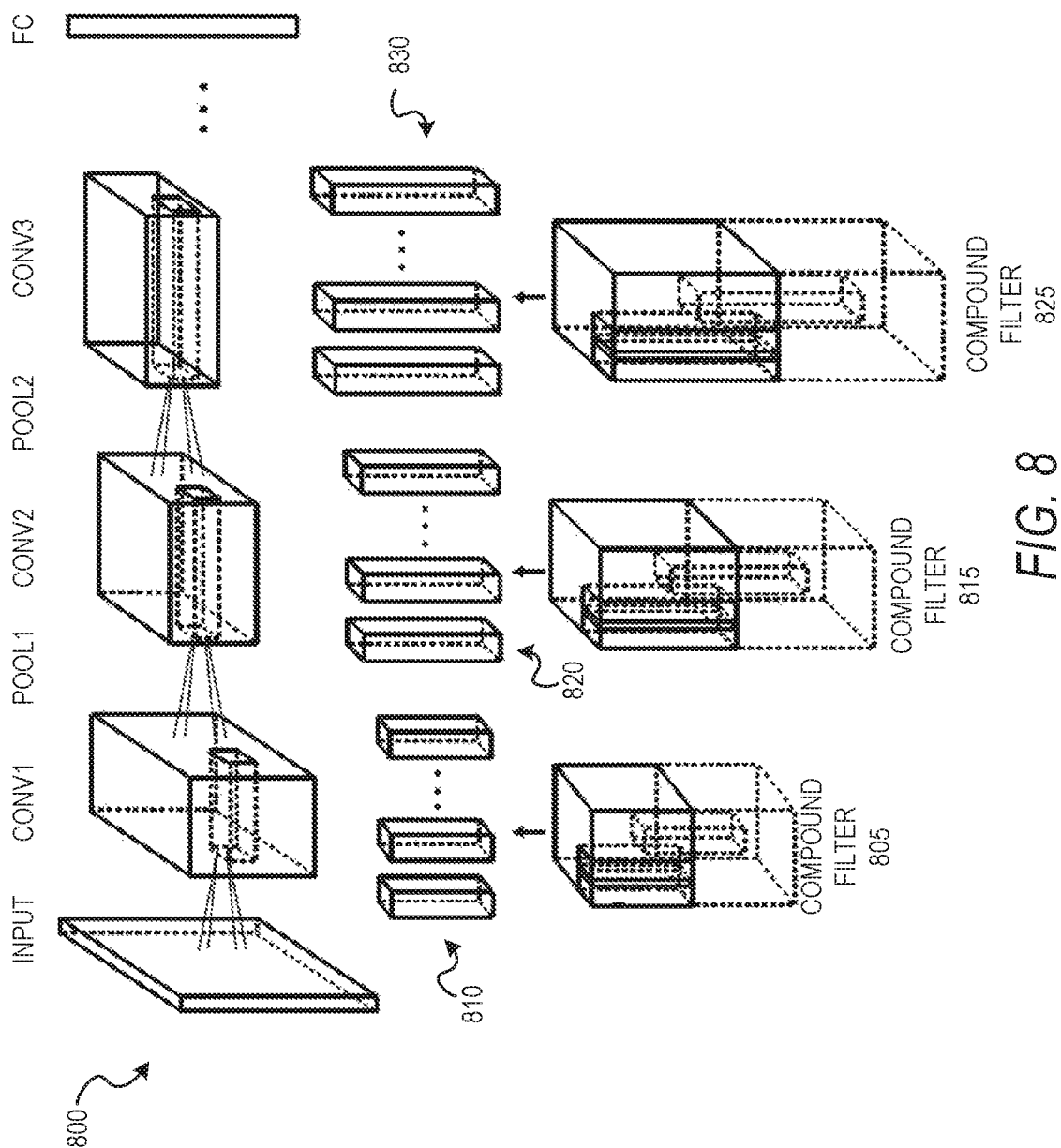
FIG. 8 shows an example compact neural network having condensed compound filters, according to some example embodiments.

FIG. 8 shows an example neural network 800 implementing compound filters, according to some example embodiments. In the example illustrated, the neural network 800 is a convolutional neural network, which receives an image in an input layer ("INPUT"), which inputs into a first convolutional layer ("CONV1"), which inputs into a first pooling layer ("POOL1"), which inputs into a second convolutional layer ("CONV2"), which is pooled in an additional pooling layer ("POOL2"), which inputs into a third convolutional layer ("CONV3"), which inputs into one or more network layers, such as a fully-connected layer ("FC"). It is appreciated that the system 210 can implement other neural networks in other configurations (e.g., additional layers, different layers) than the example configuration of neural network 800.

As illustrated, in some example embodiments each convolutional layer includes a compound filter that is used to generate a plurality of filters for use in the convolutional layer. In particular, compound filter 805 generates a plurality of filters 810 for use in the first convolutional layer ("CONV1"). Likewise, compound filter 815 generates a plurality of filters 820 for use in the second convolutional layer ("CONV2") and compound filter 825 generates a plurality of filters 830 for use in the third convolutional layer ("CONV3"). In some example embodiments, the transformation engine 610 iterates through operations 710 and 715 for each layer. That is, for each convolutional layer the transformation engine 610 identifies a compound filter (operation 715), and then generates a plurality of filters (operation 715) for use in generation of feature maps in the convolutional layer.

Figure 9:
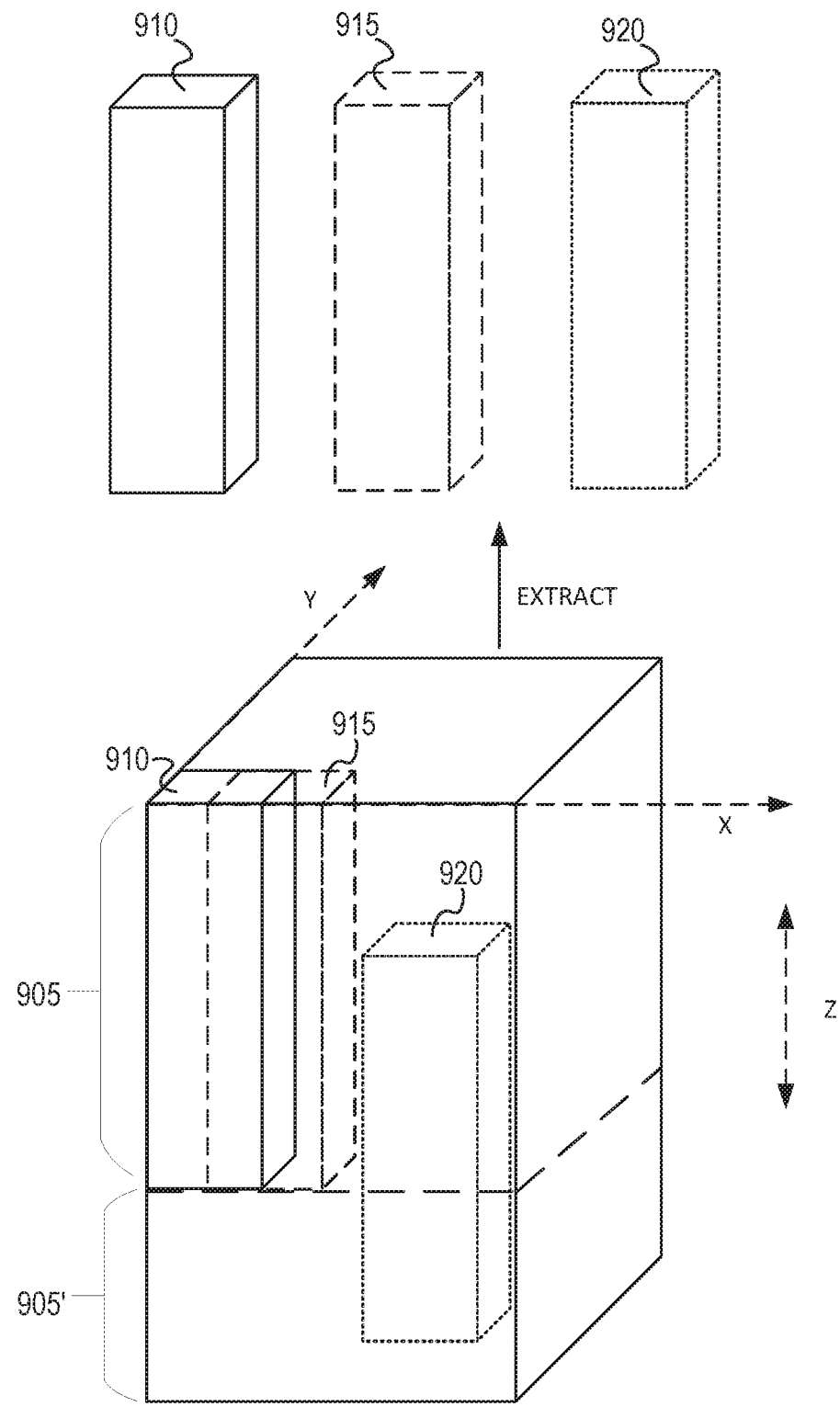
FIG. 9 shows an example individual filters generated from a condensed compound filter, according to some example embodiments.

FIG. 9 shows an example compound filter 905 of a neural network, according to some example embodiments. The compound filter 905 is a three dimensional (3D) matrix having overlapping 3D sub-matrices, e.g., filters 910, 915, and 920 which can be extracted from the compound filter 905. The parameter and weight redundancy of the extracted filters is avoided by sharing weights across nearby filters in their respective overlapping regions. A copy of the compound filter 905' is further displayed to show weight sharing along channels. That is, the weights of filter 920 can be shared from filter 910 and 915, as discussed in further detail below.

In some example embodiments, the compound filter is configured to replace a plurality of filters that would be used in a baseline CNN. For example, if the baseline CNN is ResNet-50, the filters in the first convolutional layer can be replaced by a single compound filter to generate filters for that first convolutional layer, and likewise in other convolutional layers. In some example embodiments, the compound filter for a given layer is configured to generate the same quantity of the individual filters as would be used in the given layer of the baseline CNN. In this way, instead of learning a set of independent filters for each convolution layer of CNN, a compact three dimensional compound filter of much smaller parameter size is learned and stored as part of the network layers. For example, if a convolution layer of the baseline CNN model has 64 filters of channel 64 and spatial size 3×3, the corresponding convolution layer in the CNN using compound filters will have a compound filter size of size 64×8×8 for that layer. The 64×64×3×3 filters are sampled by striding along each spatial dimension by 2, and striding along the dimension of the channel by 16. The ratio of the parameter size of the 64 independent filters to that of the corresponding compound filter is then $$\frac{64 \times 64 \times 3 \times 3}{64 \times 8 \times 8} = 9,$$

which indicates that the parameter space of a compound filter is much smaller than the independent filters in a corresponding baseline CNN.

Formally, suppose a compound filter is configured to generate $K=K_1 \times K_2 \times K_3$ filters of size $S_1 \times S_2 \times C$ where, $(S_1, S_2)$ is the spatial size of filter and C is the channel size. Let the filter sampling stride along two spatial dimensions of the compound filter be x and y, and the sampling stride along the channel dimension of the compound filter be z. Then the dimension of the compound filter is $(K_1 x, K_2 y, K_3 z)$, where $(K_1 x, K_2 y)$ is the spatial size and $K_3 z$ is the channel size. Assume for this example, the channel size of the compound filter is set to $K_3 z=C$, which is based on experimental results indicating that weights along the channel can be shared more frequently without degrading performance. On this basis, the ratio of the parameter size of the K independent filters to that of the corresponding compound filter is:

$$ParamRatio = \frac{K \cdot S_1 \cdot S_2 \cdot C}{K_1 x \cdot K_2 y \cdot K_3 z}$$

$$= \frac{K \cdot S_1 \cdot S_2 \cdot C}{K_1 x \cdot K_2 y \cdot K_3 z}$$

$$= \frac{K_1 K_2 K_3 \cdot S_1 \cdot S_2 \cdot C}{K_1 x \cdot K_2 y \cdot K_3 z}$$

$$= \frac{S_1 \cdot S_2 \cdot C}{x \cdot y \cdot z}$$

$$= \frac{S_1 \cdot S_2}{x \cdot y} \cdot K_3$$

If spatial stride is smaller than the corresponding filter size (i.e., $x<S_1$, $y<S_2$,) then the compound filter will have a compact size. It is further noted that increasing to a larger $K_3$, namely the sampling number along the channel dimension, leads to a more compact compound filter in the manner that the weights of the compound filter along the channel dimension are shared more frequently by nearby filters, according to some example embodiments.

The backward and forward operation of a convolutional layer layer having a compound filter can be configured as an algorithm or scheme. A mapping T maps the indices of the elements of the extracted filters to the indices of the corresponding element in the compound filter. For example, for a filter $F^{(k)}$ and the compound filter configured as: $F^{(M)}$, $F_t^{(k)} = F_{T(t)}^{(M)}$, the mapping T is used to track the origin of the elements of the filters extracted from the compound filter. In some example embodiments, the compound filter operates in a given convolution layer as follows:

Forward operation: Extract K overlapping layers $\{F^{(k)}\}_{k=1}^{K}$ from the FilterMap (e.g., a compound filter) $F^{(M)}$, and each filter $F^{(k)} \in \mathbb{R}^{S_1 \times S_2 \times C}$. Then convolve these K filters with the input into the given convolution layer, where K is the number of filters in the given convolution layer of a baseline CNN.

Backward operation: First obtain the gradient of all the K filters as $$\{G^{(k)}\}_{k=1}^{K},$$

where each $G^{(k)} \in \mathbb{R}^{S_1 \times S_2 \times C}$. For each element $j \in F^{(M)}$, the gradient is computed by:

$$j' = \frac{\sum_{k=1}^{K} \sum_{t} G_t^{(k)} \mathbb{1}_{T(t)=j}}{\sum_{k=1}^{K} \sum_{t} \mathbb{1}_{T(t)=j}}$$

Figure 10:
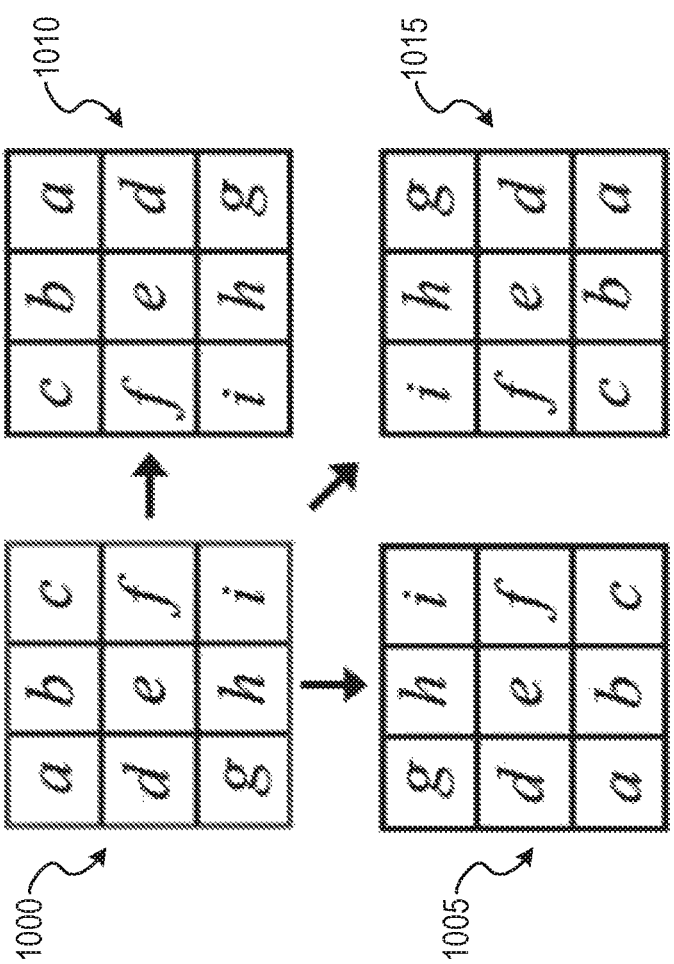
FIGS. 10 and 11 show example matrix operation for generating filters from a condensed compound filter, according to some example embodiments.

FIG. 10 shows an additional approach for generating additional filters from a compound filter 1000, according to some example embodiments. In FIG. 10, the compound filter 1000 comprises nine elements (e.g., pixels) in an 3×3 array. In some example embodiments, one or more reflections are performed to generate additional filters. For example, the compound filter 1000 may be reflected vertically to generate filter 1010, reflected horizontally to generate filter 1005, and reflected diagonally to generate filter 1015. Although the term reflection is used above, those of ordinary skill in the art appreciate that one or more matrices (not depicted) may be stored and used by multiplying them against the base filter to generate any of the filters 905, 910, and 915.

Figure 11:
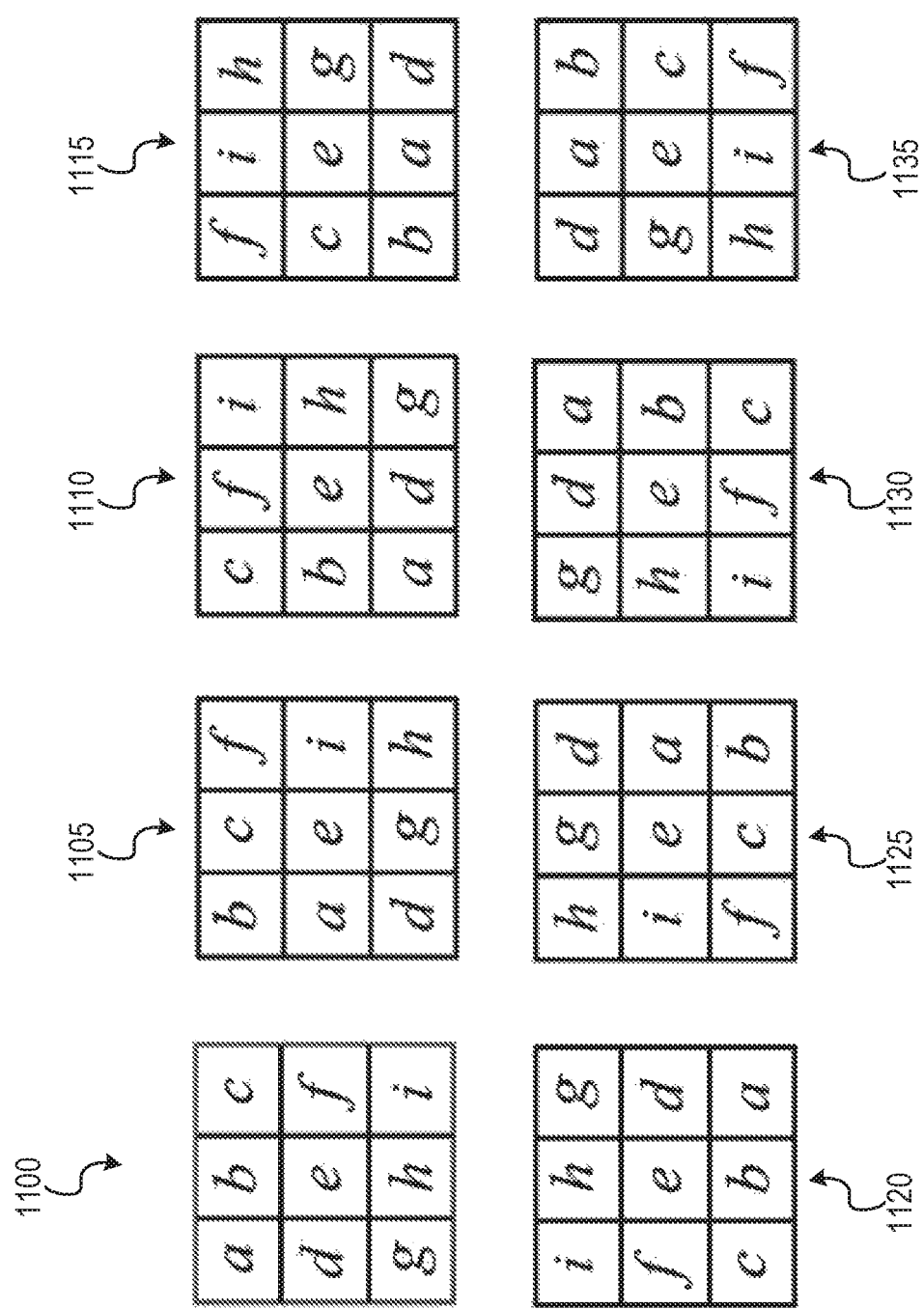

FIG. 11 shows an additional approach for generating additional filters from a compound filter 1100, according to some example embodiments. In FIG. 10, the compound filter 1100 comprises nine elements in a 3×3 array. In some example embodiments, one or more rotation operations are performed on the compound filter 1100 to generate additional filters. For example, the compound filter 1100 is rotated once in a counterclockwise direction to generate filter 1105, and once more to generate filter 1110, and so on, until filter 1135 is generated. In some example embodiments, each of the filters 1105-1135 are then used to generate features maps in a given convolutional layer of a convolutional neural network implemented by the neural network engine 615.

Figure 12:
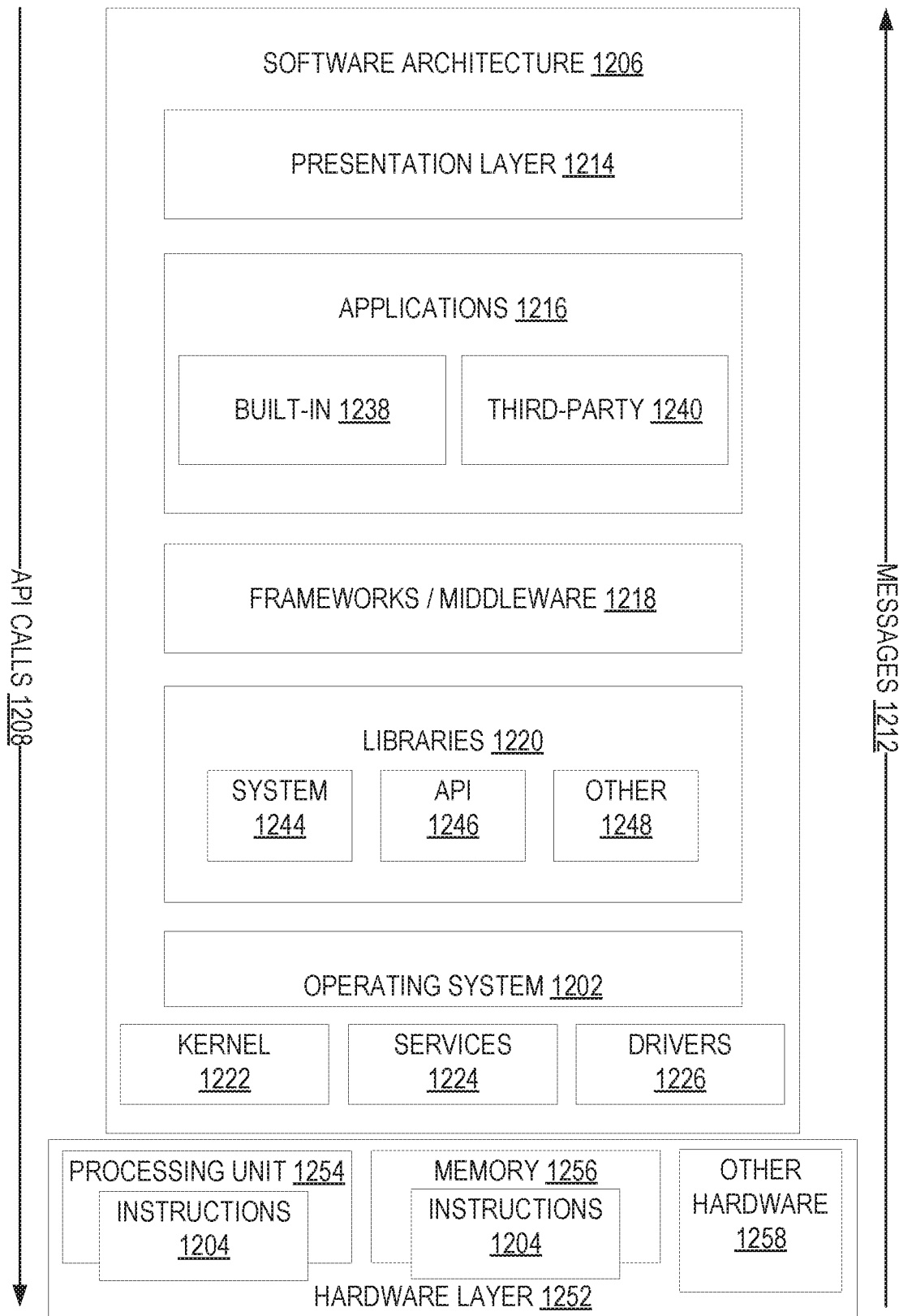
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1300 of FIG. 13 that includes, among other things, processors, memory, and I/O components. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes a memory/storage 1256, which also has the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response in the form of messages 1212. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems, interactions with a user may occur through a presentation layer, such as the presentation layer 1214. In these systems, the application/component "logic" can be separated from the aspects of the application/component that interact with a user.

Figure 13:
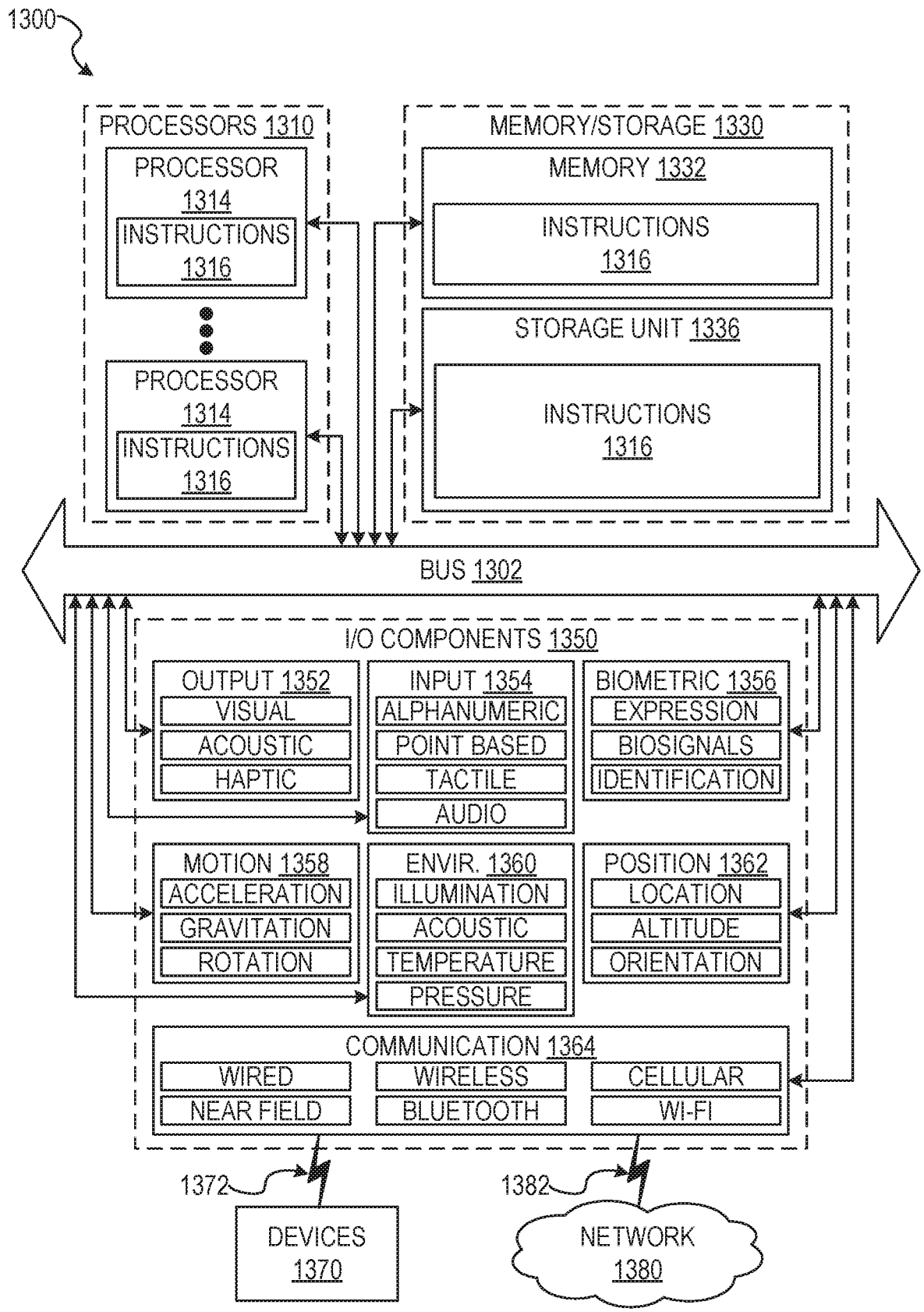
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor cache memory accessible to processor units 131bb2 or 1314), or any suitable combination thereof, during execution thereof by the machine 1300.

Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1316 for execution by the machine 1300, and includes digital or analog communications signals or other intangible media to facilitate communication of such instructions 1316. Instructions 1316 may be transmitted or received over the network 1380 using a transmission medium via a network interface device and using any one of a number of well-known transfer protocols.

"CLIENT DEVICE" in this context refers to any machine 1300 that interfaces to a communications network 1380 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1380.

"COMMUNICATIONS NETWORK" in this context refers to one or more portions of a network 1380 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1380 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1316 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions 1316 (e.g., code) for execution by a machine 1300, such that the instructions 1316, when executed by one or more processors 1310 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor $131bb2$ or a group of processors 1310) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1300) uniquely tailored to perform the configured functions and are no longer general-purpose processors 1310. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor $131bb2$ configured by software to become a special-purpose processor, the general-purpose processor $131bb2$ may be configured as respectively different special-purpose processors (e.g., comprising different hardware components) at different times. Software accordingly configures a particular processor $131bb2$ or processors 1310, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1310 that are temporarily configured (e.g., by software) or permanently configured to perform the relevant operations. Whether temporarily or permanently configured, such processors 1310 may constitute processor-implemented components that operate to perform one or more operations or functions described herein. As used herein, "processor-implemented component" refers to a hardware component implemented using one or more processors 1310. Similarly, the methods described herein may be at least partially processor-implemented, with a particular processor 131bb2 or processors 1310 being an example of hardware. For example, at least some of the operations of a method may be performed by one or more processors 1310 or processor-implemented components. Moreover, the one or more processors 1310 may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network 1380 (e.g., the Internet) and via one or more appropriate interfaces (e.g., an API). The performance of certain of the operations may be distributed among the processors 1310, not only residing within a single machine 1300, but deployed across a number of machines 1300. In some example embodiments, the processors 1310 or processor-implemented components may be located in a single geographic location (e.g., within a home environment, an office environment, or a server farm). In other example embodiments, the processors 1310 or processor-implemented components may be distributed across a number of geographic locations.

"PROCESSOR" in this context refers to any circuit or virtual circuit (a physical circuit emulated by logic executing on an actual processor 131bb2) that manipulates data values according to control signals (e.g., "commands," "op codes," "machine code," etc.) and which produces corresponding output signals that are applied to operate a machine 1300. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1310 may further be a multi-core processor 1310 having two or more independent processors 131bb2, 1314 (sometimes referred to as "cores") that may execute instructions 1316 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
generating, using one or more processors of a machine, an image;
generating, from a compound neural network filter, a plurality of additional filters, wherein the plurality of additional filters are kernels of a convolution layer in a convolutional neural network;
generating, using the convolutional neural network, a modified image from the image, the convolutional neural network configured to generate the modified image by applying the plurality of additional filters to the image; and
causing the modified image to be displayed on a network site.

2. The method of claim 1, wherein the plurality of additional filters are generated by sampling the compound neural network filter.

3. The method of claim 2, wherein the plurality of additional filters overlap in the compound neural network filter.

4. The method of claim 1, wherein the plurality of additional filters share weights.

5. The method of claim 1, wherein the convolutional neural network comprises a plurality of convolution layers, each convolution layer having a corresponding compound neural network filter configured to generate a plurality of individual filters for that convolution layer, the plurality of convolution layers comprising the convolution layer.

6. The method of claim 5, further comprising:
generating, for each of the convolution layers, a set of additional filters from a corresponding compound filter.

7. The method of claim 1, wherein at least one of the plurality of additional filters is generated using a rotation operation.

8. The method of claim 1, wherein at least one of the plurality of additional filters is generated using a reflection operation.

9. The method of claim 1, wherein the convolutional neural network is configured to perform image segmentation.

10. The method of claim 1, wherein the convolutional neural network is configured to perform image style transfer.

11. The method of claim 1, wherein the modified image is published as an ephemeral message on the network site.

12. A system comprising:
one or more processors of a machine; and
a memory storing instructions that, when executed by the one or more processors, cause the machine to perform operations comprising:
generating, using one or more processors of a machine, an image;
generating, from a compound neural network filter, a plurality of additional filters, wherein the plurality of additional filters are kernels of a convolution layer in a convolutional neural network;
generating, using the convolutional neural network, a modified image from the image, the convolutional neural network configured to generate the modified image by applying the plurality of additional filters to the image; and
causing the modified image to be displayed on a network site.

13. The system of claim 12, wherein the plurality of additional filters are generated by sampling the compound neural network filter.

14. The system of claim 13, wherein the plurality of additional filters overlap in the compound neural network filter.

15. The system of claim 12, wherein the plurality of additional filters share weights.

16. The system of claim 12, wherein the convolutional neural network comprises a plurality of convolution layers, each convolution layer having a corresponding compound neural network filter configured to generate a plurality of individual filters for that convolution layer, the plurality of convolution layers comprising the convolution layer.

17. A machine-readable storage device embodying instructions that, when executed by a machine, cause the machine to perform operations comprising:

generating, using one or more processors of a machine, an image;

generating, from a compound neural network filter, a plurality of additional filters, wherein the plurality of additional filters are kernels of a convolution layer in a convolutional neural network;

generating, using the convolutional neural network, a modified image from the image, the convolutional neural network configured to generate the modified image by applying the plurality of additional filters to the image; and causing the modified image to be displayed on a network site.

18. The machine-readable storage device of claim 17, wherein the plurality of additional filters are generated by sampling the compound neural network filter.

\* \* \* \* \*

UNITED STATES PATENT AND TRADEMARK OFFICE
CERTIFICATE OF CORRECTION

PATENT NO. : 10,872,292 B1
APPLICATION NO. : 16/155656
DATED : December 22, 2020
INVENTOR(S) : Yang et al.

Page 1 of 1

It is certified that error appears in the above-identified patent and that said Letters Patent is hereby corrected as shown below:

On the Title Page

Item [71], Column 1, Lines 1-3, delete "Applicants: Yingzhen Yang, Los Angeles, CA (US); Jianchao Yang, Los Angeles, CA (US); Ning Xu, Irvine, CA (US)" and insert --Applicant: Snap Inc., Santa Monica, CA (US)-- therefor Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*